United States Patent
Ishido

(10) Patent No.: US 8,064,106 B2
(45) Date of Patent: *Nov. 22, 2011

(54) DOCUMENT READING APPARATUS AND RELATED DATA TRANSFER METHOD

(75) Inventor: Katsuhiro Ishido, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/020,701

(22) Filed: Feb. 3, 2011

(65) Prior Publication Data

US 2011/0128597 A1  Jun. 2, 2011

Related U.S. Application Data

(63) Continuation of application No. 12/098,285, filed on Apr. 4, 2008, now Pat. No. 7,903,297.

(30) Foreign Application Priority Data

Apr. 18, 2007 (JP) ................................. 2007-109497

(51) Int. Cl.
*H04N 1/04* (2006.01)
*G06F 3/12* (2006.01)

(52) U.S. Cl. .......... 358/474; 358/496; 358/498; 358/1.1

(58) Field of Classification Search ................... 358/1.1, 358/296, 474, 487, 491, 496, 498, 505
See application file for complete search history.

(56) References Cited

U.S. PATENT DOCUMENTS 7,903,297 B2 * 3/2011 Ishido .......................... 358/474

FOREIGN PATENT DOCUMENTS

JP  2-291763 A  12/1990

* cited by examiner

*Primary Examiner* — Thierry Pham
(74) *Attorney, Agent, or Firm* — Canon USA, Inc., I.P. Division

(57) ABSTRACT

A document reading apparatus includes a conveying unit configured to continuously convey a document having a series of sheets along a conveyance path, a reading unit configured to obtain image data by reading a sheet at a predetermined reading position, a storage unit configured to store the image data obtained by the reading unit, and a transfer unit configured to transfer the stored image data to a transfer destination. The transfer satisfies a relationship $X+Y \geq Z > X$, wherein X represents a reading time required for the reading unit to read said sheet, Y represents an interval time between an end of reading said sheet and a beginning of reading a next sheet of the series, and Z represents a transfer time required for the transfer unit to transfer the image data stored in the storage unit to the transfer destination. A related method is also disclosed.

6 Claims, 7 Drawing Sheets understand# DOCUMENT READING APPARATUS AND RELATED DATA TRANSFER METHOD

CROSS REFERENCE TO RELATED APPLICATIONS

This application is a continuation of U.S. application Ser. No. 12/098,285, filed Apr. 4, 2008, which claims the benefit of Japanese Patent Application No. 2007-109497 filed Apr. 18, 2007, each of which is hereby incorporated by reference herein in its entirety.

BACKGROUND OF THE INVENTION

1. Field of the Invention

The present invention relates to a document reading apparatus capable of reading a document which moves along a predetermined conveyance path and a related data transfer method.

2. Description of the Related Art

Conventionally, a document reading apparatus can be installed on or incorporated into a digital copying machine, a facsimile machine, or a scanner device. A document reading apparatus installed on a copying machine which operates in a "document feeding-reading" mode is known. According to this operation mode, the sheets of a document stacked on a document tray are conveyed one after another to a document positioning glass plate, each sheet is exposed by an exposure apparatus fixed on a conveyance path, and an image of the exposed sheet is read by an image sensor.

In recent years, to improve the reading efficiency of the document reading apparatus that performs the above-described document feeding-reading operation, it has been effective to reduce a distance between two consecutive sheets (referred to as "sheet-to-sheet interval") when the sheets stacked on the document tray are conveyed one after another along a conveyance path. This technique can increase the number of readable sheets per unit time.

For example, as discussed in Japanese Patent Application Laid-Open No. 2005-324872, the sheet-to-sheet interval can be reduced by quickly starting a feeding operation of a sheet upon detecting the trailing edge of a preceding sheet. The conveying speed of a document can be reduced without deteriorating the reading efficiency.

However, according to the above-described conventional document reading apparatus, the following problems occur if a plurality of sheets is continuously read and read image data are transferred in real-time to a printer connected to the document reading apparatus.

Namely, to keep a certain sheet interval between a preceding sheet and a following sheet, the time available for transferring the image data becomes shorter. Thus, the image data needs to be transferred at a clock frequency higher than a pre-designated clock frequency required to attain an intended reading efficiency.

If the entire system operates at a higher clock frequency, various problems (e.g., temperature rise, increase in electric power consumption, and generation of radiation noises) occur. Realizing a timing design for an application specific integrated circuit (ASIC) or other IC that performs image processing also becomes difficult.

SUMMARY OF THE INVENTION

The present invention is directed to a document reading apparatus which enables an entire system to operate at a lower clock frequency while improving an efficiency of reading a plurality of sheets. Furthermore, the present invention is directed to a related data transfer method.

According to an aspect of the present invention, a document reading apparatus is capable of conveying a document having a series of sheets along a conveyance path and of reading each sheet of the series at a predetermined reading position on the conveyance path. The document reading apparatus includes a conveying unit configured to continuously convey the document along the conveyance path, a reading unit configured to obtain image data by reading a sheet of the series at the predetermined reading position, a storage unit configured to store the image data obtained by the reading unit, and a transfer unit configured to transfer the stored image data to a transfer destination. In accordance with the aspect, the transfer unit transfers the image data to the transfer destination to satisfy a relationship $X+Y \geq Z > X$, wherein $X$ represents a reading time required for the reading unit to read said sheet of the series, $Y$ represents an interval time between an end of reading said sheet of the series and a beginning of reading a next sheet of the series, and $Z$ represents a transfer time required for the transfer unit to transfer the image data stored in the storage unit to the transfer destination.

According to another aspect of the present invention, a method is provided for a document reading apparatus capable of conveying a document having a series of sheets along a conveyance path and reading each sheet of the series at a predetermined reading position on the conveyance path. The method includes conveying the document continuously along the conveyance path; obtaining image data by reading a sheet of the series at the predetermined reading position; storing the obtained image data into a storage medium; and transferring the stored image data to a transfer destination. Moreover, the image data is transferred to the transfer destination to satisfy a relationship $X+Y \geq Z > X$, wherein $X$ represents a reading time required for reading said sheet of the series, $Y$ represents a document interval time between an end of reading said sheet of the series and a beginning of reading a next sheet of the series, and $Z$ represents a transfer time required for transferring the image data stored in the storage medium to the transfer destination.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain of the principles of the present invention.

DETAILED DESCRIPTION OF THE EMBODIMENTS

The following description of exemplary embodiments of the present invention is illustrative in nature and is in no way intended to limit the invention, its application, or uses. Throughout the specification, a repeated reference mark refers to the same item (or alternatively similar items) where it appears in more than place. Once an item is described in one figure, it may not be described further for the remaining figures where such further description would be redundant. Exemplary embodiments are described in detail below with reference to the drawings.

First Exemplary Embodiment

Figure 1:
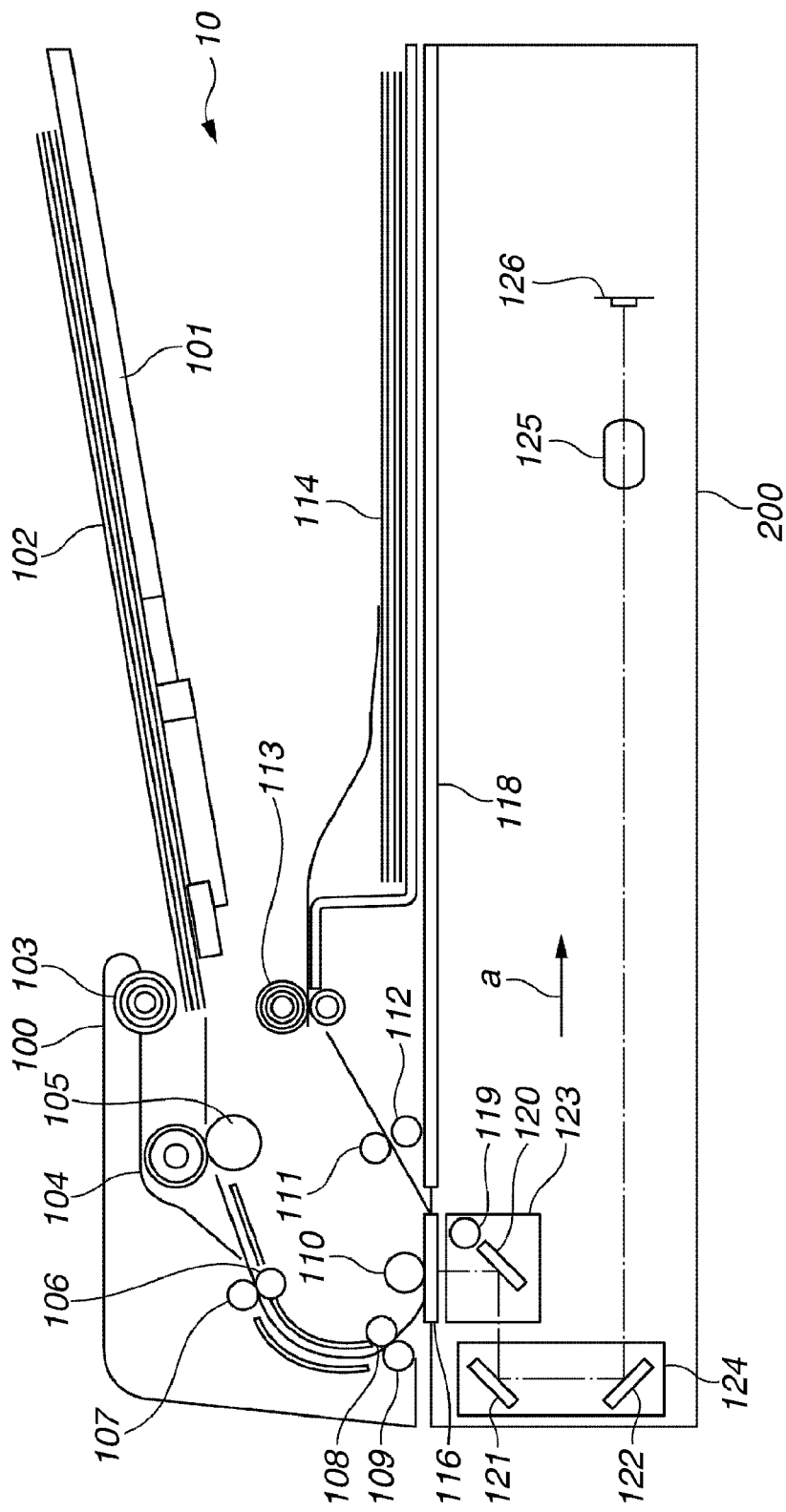
FIG. 1 illustrates a cross-sectional view of an example document reading apparatus according to an exemplary embodiment of the present invention.

FIG. 1 illustrates a cross-sectional view of a document reading apparatus 10 according to an exemplary embodiment of the present invention. The document reading apparatus 10 can be installed on or incorporated into a digital copying machine, a facsimile machine, a scanner device, or other device which includes an automatic document feeder capable of continuously conveying a document having a plurality of sheets.

The document reading apparatus 10 includes an automatic document feeder 100 and a reader unit 200. The reader unit 200 is configured to read an image on each document conveyed from the automatic document feeder 100 which can continuously convey a plurality of documents. The automatic document feeder 100 includes a document tray 101 on which the sheets of the document 102 can be stacked. A sheet feeding roller 103 is positioned near the document tray 101.

The sheet feeding roller 103 and a separation/conveyance roller 104 are connected to a common driving source that can drive the rollers 103 and 104 to feed the document 102. The sheet feeding roller 103 is initially positioned at a retreated home position (upper position) where the sheet feeding roller 103 does not interfere with a user who sets the documents 102. If the automatic document feeder 100 starts a sheet feeding operation, the sheet feeding roller 103 moves downward and contacts an uppermost sheet of the document 102. The sheet feeding roller 103 can move in the up-and-down direction in accordance with a swing motion of arms (not illustrated) which support a shaft of the sheet feeding roller 103.

A separation/conveyance roller 105 is located facing the separation/conveyance roller 104 and pressed against the separation/conveyance roller 104. The separation/conveyance roller 105 is made of a rubber member capable of generating a frictional force slightly smaller than that of a member constituting the separation/conveyance roller 104. The separation/conveyance roller 105 is indirectly driven by means of frictional force. The separation/conveyance rollers 104 and 105 cooperate to separate the uppermost sheet of the stacked documents 102 and convey the separated document 102 one sheet after another along a conveyance path when the plurality of sheets of the document 102 are fed from the document tray 101 via the sheet feeding roller 103.

A registration roller 106 and a driven registration roller 107 (i.e., a registration roller pair) align a leading edge of the document 102 separated and conveyed by the separation/conveyance rollers 104 and 105. If the leading edge (i.e., front edge) of the separated document 102 abuts a nip portion of the registration roller pair 106 and 107 which is in a stationary state, the leading edge of the document 102 is aligned while the document 102 deforms in a loop shape.

A lead roller 108 and a driven lead roller 109 cooperatively convey the document 102 toward a document feeding-reading glass 116. A platen roller 110 is disposed facing the document feeding-reading glass 116. When a sheet of the document 102 moves across the document feeding-reading glass 116, a charge coupled device (CCD) line sensor 126 reads an image on the sheet.

After the CCD line sensor 126 completes an image reading operation, a lead discharge roller 111 and a driven lead discharge roller 112 cooperatively convey the sheet of the document 102 toward a sheet discharge roller 113. The sheet discharge roller 113 discharges the sheet of the document 102 to a sheet discharge tray 114. This process is repeated for each sheet of the document.

The reader unit 200 includes a lamp 119, three mirrors 120, 121, and 122, a lens 125, and the CCD line sensor 126. The lamp 119 emits light toward a surface of the document 102 to be read. The mirrors 120, 121, and 122 sequentially reflect the reflection light from the document 102 and guide the reflection light toward the lens 125 and the CCD line sensor 126. Both the lamp 119 and the mirror 120 are mounted on a first mirror base 123. The mirrors 121 and 122 are mounted on a second mirror base 124.

The first mirror base 123 and the second mirror base 124 which are respectively connected to a driving motor (not illustrated) via a wire (not illustrated) can move horizontally in parallel with a document positioning glass plate 118 when the driving motor rotates. The reflection light from the document 102 is guided toward the lens 125 by the mirrors 120, 121, and 122. The light having passed through the lens 125 forms an image on a light-receiving portion of the CCD line sensor 126. The CCD line sensor 126 photoelectrically converts the reflection light (the formed image) by a light-sensitive element and outputs an electric signal representing a quantity of incident light at each portion or pixel of the image. The document reading apparatus 10 optionally may include color scanning capabilities, in which case, an electrical signal additionally indicates the color at each portion or pixel of the image.

The document reading apparatus 10 has two operation modes, a document fixed-reading mode and a document feeding-reading mode, which are selectable by a user. In the document fixed-reading mode, the document reading apparatus 10 reads an image on a sheet of the document 102 which is manually set by a user on the document positioning glass plate 118, while the first mirror base 123 and the second mirror base 124 move in the sub-scanning direction (i.e., in the direction indicated by an arrow "a" in FIG. 1).

In the document feeding-reading mode, the document reading apparatus 10 reads a respective image on each sheet of the document 102 which is automatically supplied from the automatic document feeder 100. The reading occurs at a pre-determined position of the document feeding-reading glass 116 (i.e. document reading position) while the first mirror base 123 and the second mirror base 124 are stopped.

The document conveying interval is described below. The time required for the separation/conveyance roller 104 and the driven separation/conveyance roller 105 to separate a sheet of the document 102 fed by the sheet feeding roller 103 from the document tray 101 is variable depending on surface qualities of the document 102. The leading edge of separated and conveyed sheet of the document 102 is then aligned by the registration roller 106 and the driven registration roller 107.

Then, the sheet of the document 102 is conveyed by the lead roller 108 and the driven lead roller 109 toward the document feeding-reading glass 116.

An interval between a sheet of the document and a next sheet of the document is determined considering a variation in the above-described time required for separating the sheets of the document 102. Namely, the automatic document feeder 100 controls a document feeding operation to keep the constant interval between sequential pairs of sheets which are consecutively conveyed. In this exemplary embodiment, the document conveying interval is set to 40 mm.

Figure 2:
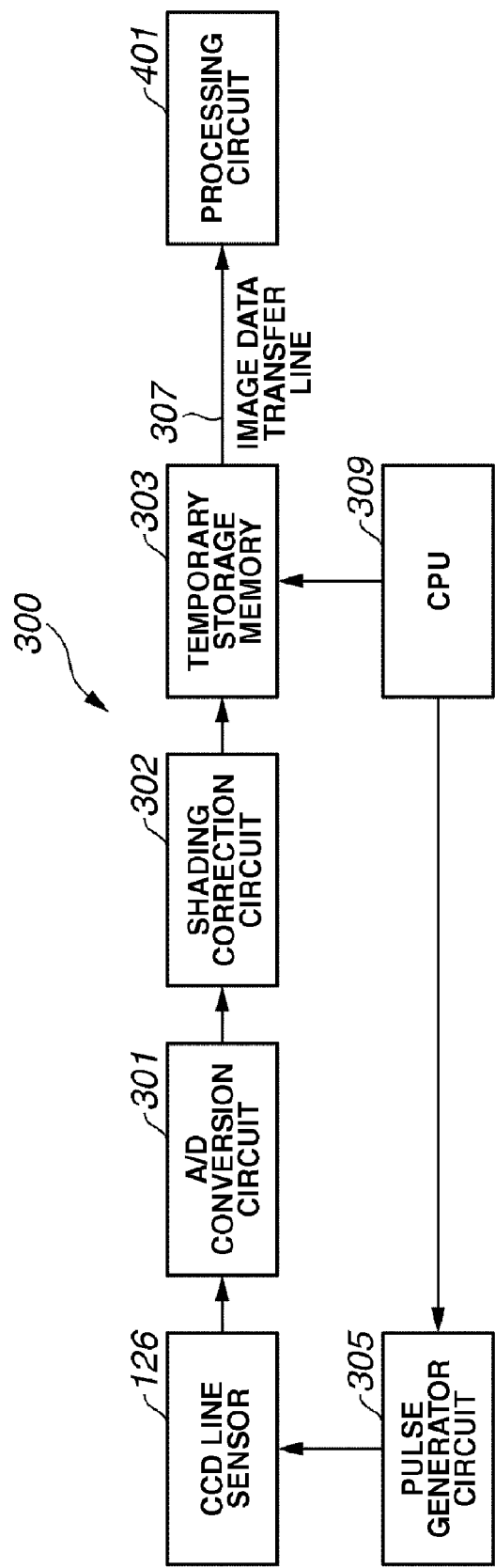
FIG. 2 is a block diagram illustrating an example control unit of an image processing system according to an exemplary embodiment of the present invention.

FIG. 2 is a block diagram illustrating a control unit 300 of an image processing system according to an exemplary embodiment of the present invention. The control unit 300 includes an analog-to-digital (A/D) conversion circuit 301, a shading correction circuit 302, a temporary storage memory 303, a pulse generator circuit 305, an image data transfer line 307, a central processing unit (CPU) 309, and the CCD line sensor 126.

The pulse generator circuit 305 generates a pulse to drive the CCD line sensor 126 that reads a surface of the document 102. The A/D conversion circuit 301 receives an analog signal from the CCD line sensor 126 and converts the received signal into a digital signal. The shading correction circuit 302 performs a shading correction on image data (i.e., the digital signal produced by the A/D conversion circuit 301).

The temporary storage memory 303 (i.e., a storage medium) temporarily stores the image data having been subjected to the shading correction. The image data stored in the temporary storage memory 303 can be transferred via the image data transfer line 307 to a processing circuit 401. The processing circuit 401 is a transfer destination and may be, for example, a printer or a computer.

The CPU 309 controls a document reading operation. The CPU 309 can change a driving speed of the CCD line sensor 126 which can be set in the pulse generator circuit 305 as well as a transfer speed of data transferred from the temporary storage memory 309 to the processing circuit 401.

Figure 3:
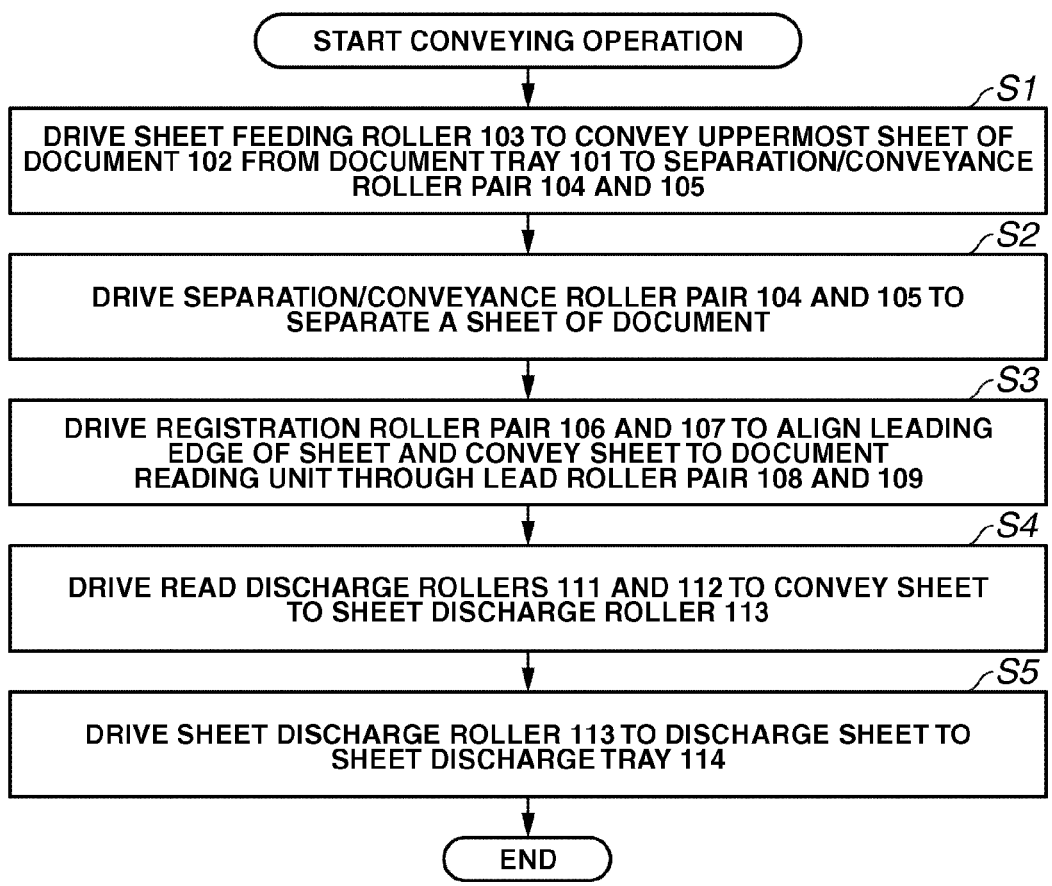
FIG. 3 is a flowchart illustrating an example conveying operation procedure performed by an automatic document feeder according to an exemplary embodiment of the present invention.

The above-described document reading apparatus can, for example, perform the following operation. FIG. 3 is a flowchart illustrating an example conveying operation procedure performed by the automatic document feeder 100 according to an exemplary embodiment of the present invention.

First, in step S1, the automatic document feeder 100 drives the sheet feeding roller 103 to convey the uppermost sheet of the document 102 which is placed on the document tray 101 to the separation/conveyance roller pair 104 and 105.

In step S2, if two or more sheets of the document 102 are simultaneously conveyed, the automatic document feeder 100 drives the separation/conveyance rollers 104 and 105 to separate a sheet of document 102.

In step S3, the automatic document feeder 100 conveys the separated sheet of the document 102 to a downstream side where the registration roller pair 106 and 107 aligns the leading edge of the separated sheet of the document 102 and guides the separated sheet of the document 102 to a gap between the lead roller pair 108 and 109. Then, the separated sheet of the document 102 is conveyed to the document reading position (document reading unit).

In step S4, the automatic document feeder 100 drives the lead discharge rollers 111 and 112 to convey the separated sheet of the document 102 having been subjected to the reading operation.

In step S5, the automatic document feeder 100 drives the sheet discharge roller 113 to discharge the separated sheet of the document 102 to the sheet discharge tray 114. As described above, in the document conveying operation performed by the automatic document feeder 100, the interval between two consecutively conveyed sheets of the document 102 is controlled to be a constant value (e.g., 40 mm).

Figure 4:
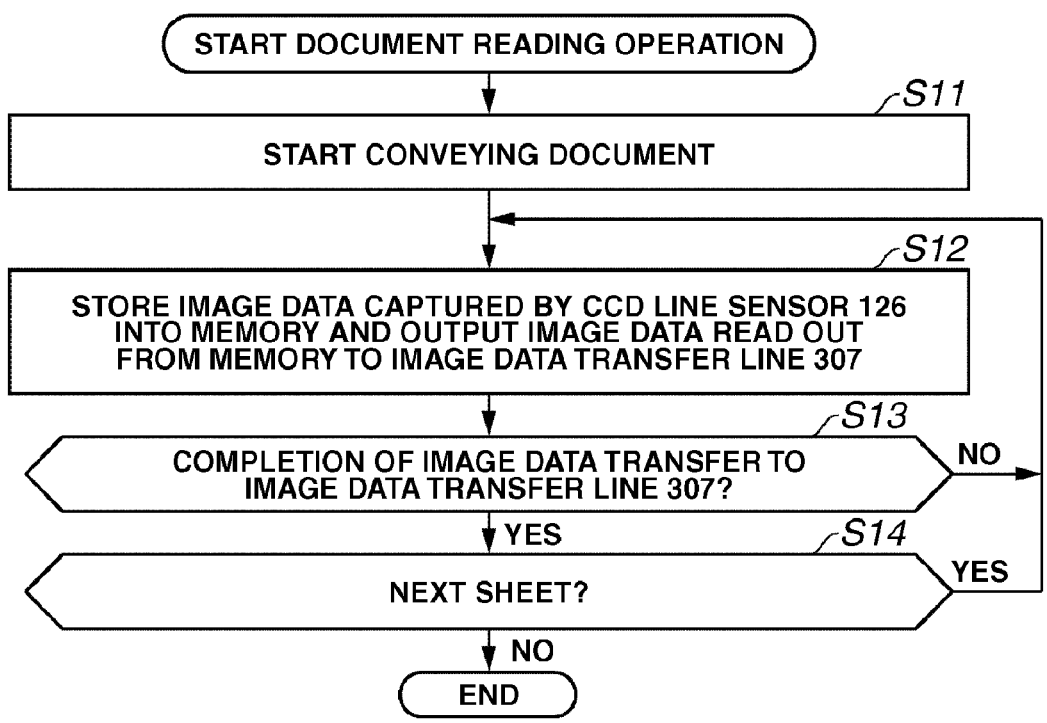
FIG. 4 is a flowchart illustrating an example document reading procedure according to an exemplary embodiment of the present invention.

FIG. 4 is a flowchart illustrating an example document reading procedure according to an exemplary embodiment of the present invention.

In step S11, the document reading apparatus 10 starts the document conveying operation described with reference to the flowchart illustrated in FIG. 3.

In step S12, if a sheet of the document 102 reaches the document reading position, the document reading apparatus 10 causes the CCD line sensor 126 to start reading an image on the sheet of the document 102 and stores the read image data in the temporary storage memory 303. Concurrently, the document reading apparatus 10 starts reading out the image data from the temporary storage memory 303 and transferring image data to the processing circuit 401 via the image data transfer line 307.

In step S13, the document reading apparatus 10 determines whether the above-described transfer operation for reading out the image data from the temporary storage memory 303 and transferring the read image data via the image data transfer line 307 has been completed. If the transfer operation has not been completed (NO in step S13), the document reading apparatus 10 repeats the above-described processing of step S12. It is not necessary in this repetition of step S12 to rewrite image data into the temporary storage memory 303 as the un-transferred portion of the already stored data for the sheet continues to be stored at least until the transfer operation for that sheet is complete.

If the transfer operation has been completed (YES in step S13), the procedure proceeds to step S14. In step S14, the document reading apparatus 10 determines whether the next sheet of the document 102 is present. If a next sheet of the document is present (YES in step S14), the document reading apparatus 10 returns to step S12 to process that next sheet. However, if a next sheet of the document 102 is not present (NO in step S14), the document reading apparatus 10 completes the document reading operation.

The document conveying speed and the driving speed of the CCD line sensor 126 are in the following relationship. It is now assumed that the document reading apparatus operates at a driving speed capable of reading 60 sheets of A4 document per minute. If a document reading speed is constant, the document reading operation needs to be performed at a speed of reading one sheet per second.

The sub-scanning length for A4 size is 210 mm. If the document conveying interval (sheet-to-sheet interval) is set to 40 mm, the CCD line sensor 126 needs to be driven at a reading speed of 250 mm per second.

It is now assumed that the document reading operation is performed at the resolution of 600 dots per inch (dpi). According to the above-described conditions, the scanning time per sub-scanning line can be obtained according to the following formula (1).

$$\text{One sub-scanning line time} = 1 \text{ sec}/(250 \text{ mm}/(25.4 \text{ mm}/600)) \quad (1)$$

Namely, it can be understood that the driving speed of the CCD line sensor 126 is required one sub-scanning line time=169 μsec.

Furthermore, if the CCD line sensor 126 is driven under the above-described conditions, the sub-scanning magnification becomes 100% when the conveying speed of each document conveying roller is 250 mm per second. Therefore, a required conveying speed of each roller is equal to 250 mm/sec.

Figure 5:
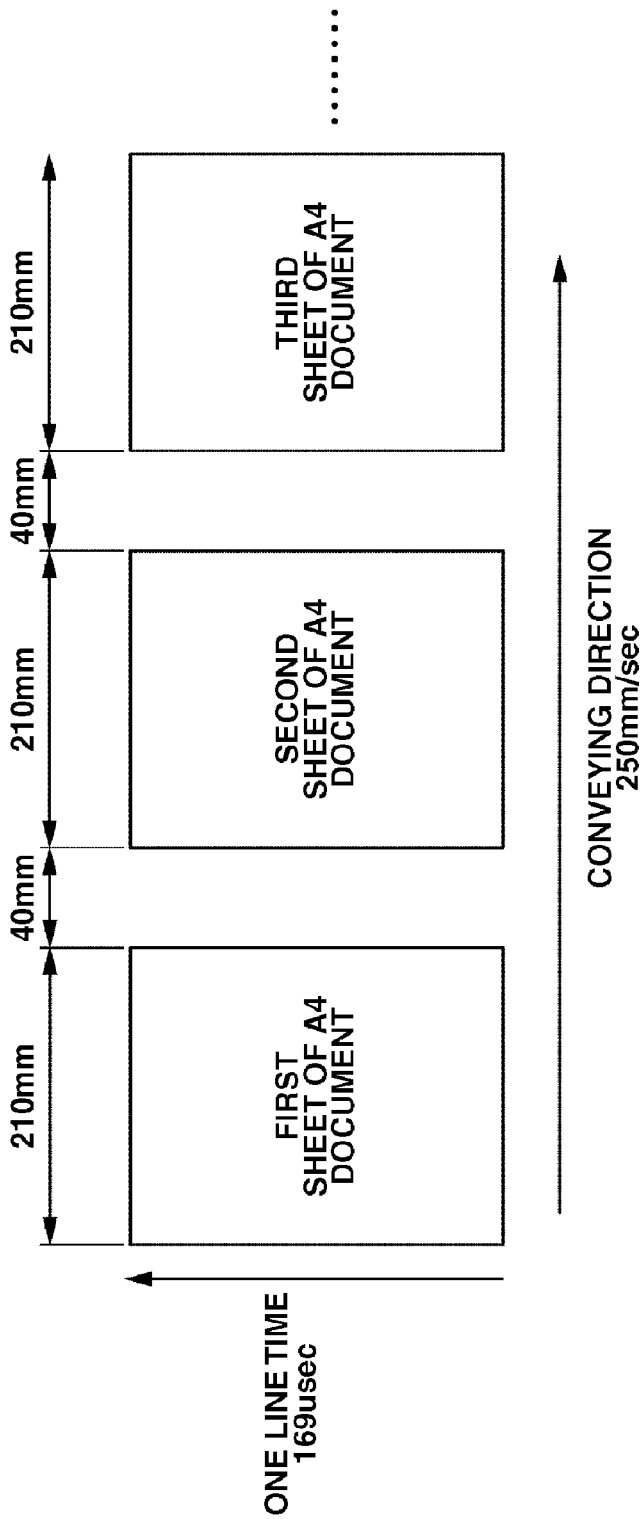
FIG. 5 illustrates an example operation for conveying a plurality of documents.

FIG. 5 illustrates an example operation for conveying a series of sheets of the document 102. The main scanning time is described below. The CCD line sensor 126 includes light-sensitive elements for 7200 pixels that can attain 600 dpi resolution in a reading operation of A4 document. The main scanning length for A4 size is 297 mm. Therefore, an effective area for reading actual document image data on a sheet of the A4 document is approximately 7016 pixels.

If the CCD line sensor 126 is a CCD type linear sensor, a non-effective area period of approximately 10 μsec is required. The non-effective area period is, for example, a shift transfer period during which electric charge is transferred from a photodiode to a CCD transfer register. The numerical value of the non-effective area period is variable depending on the CCD type.

Therefore, the time required for transferring one pixel can be obtained according to the following formula (2).

$$\text{Transfer period for one pixel} = (169-10)/7200 \quad (2)$$

Namely, transfer period for one pixel=22.08 nsec (45.28 MHz).

Here, the transfer speed of image data transferred via the image data transfer line 307 is described below. It is now assumed that the CCD line sensor 126 is driven at a reading speed of 250 mm per second and the image data captured by the CCD line sensor 126 is directly transferred to the image data transfer line 307 without being temporarily stored in the temporary storage memory 303.

Figure 6:
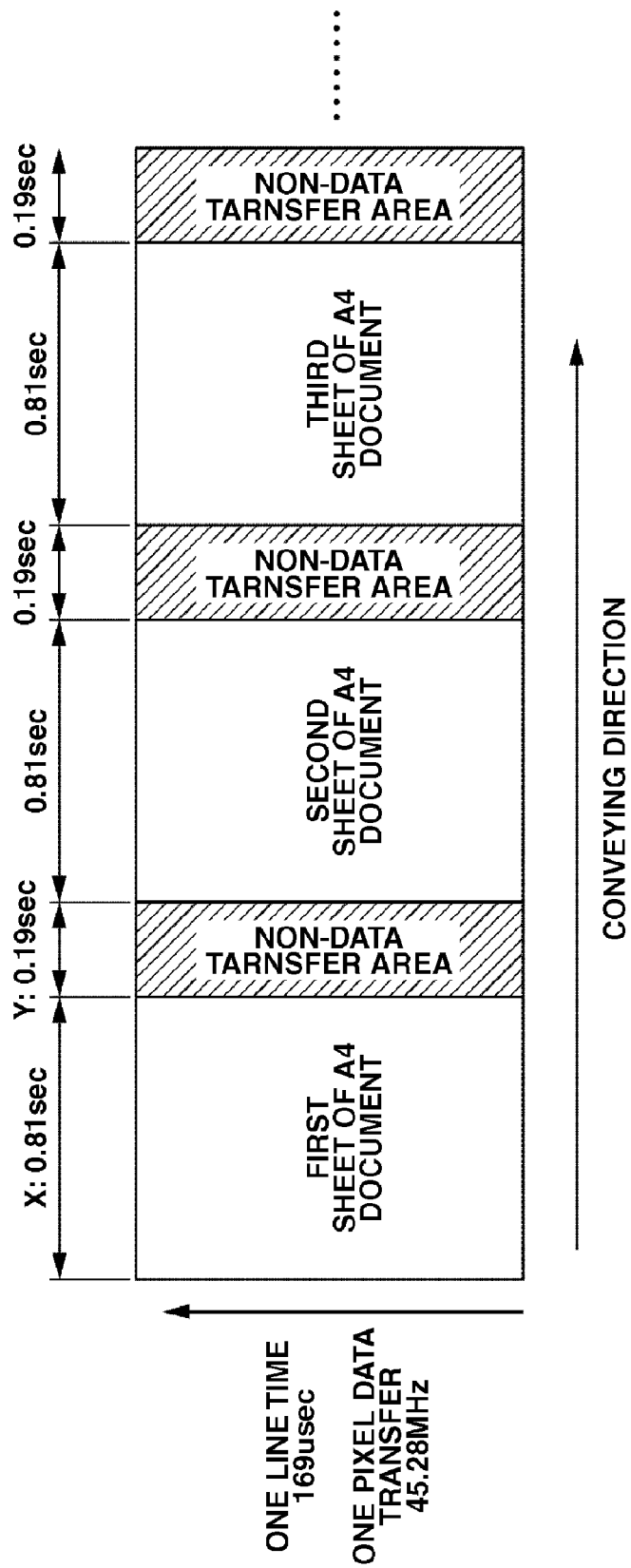
FIG. 6 illustrates an example transfer of image data.

FIG. 6 illustrates an example transfer of image data. In this example, the document conveying interval is 40 mm and the length of an area capable of actually transferring effective data to the image data transfer line 307 is limited to 210 mm. Furthermore, the reading time X required for reading a sheet of the document 102 is 0.81 sec, and the document interval time Y between a sheet of the document 102 and a next sheet of the document 102 is 0.19 sec when the aforementioned next sheet of the document 102 is conveyed to the document reading position.

Next, it is assumed that image data captured by the CCD line sensor 126 is stored in the temporary storage memory 303 and a time for the document conveying interval of 40 mm can be used for the transfer of image data. In this example, it is unnecessary to consider the presence of document conveying interval. Therefore, the transfer time for one sub-scanning line can be obtained according to the following formula (3).

$$\text{Transfer time for one sub-scanning line} = 1 \text{ sec}/(210 \text{ mm}/(25.4 \text{ mm}/600)) \quad (3)$$

Namely, it is required to transfer the image data to the processing circuit during the obtained transfer time for one sub-scanning line (=201.59 μsec).

Furthermore, the main scanning time is described below. The time required for transferring the data of one pixel (i.e., one of 7200 pixels) can be obtained according to the following formula (4).

$$\text{Transfer period for one pixel} = 201.59/7200 \quad (4)$$

Namely, transfer period for one pixel=28.00 nsec (35.72 MHz). Therefore, the data transfer clock can be greatly reduced.

Figure 7:
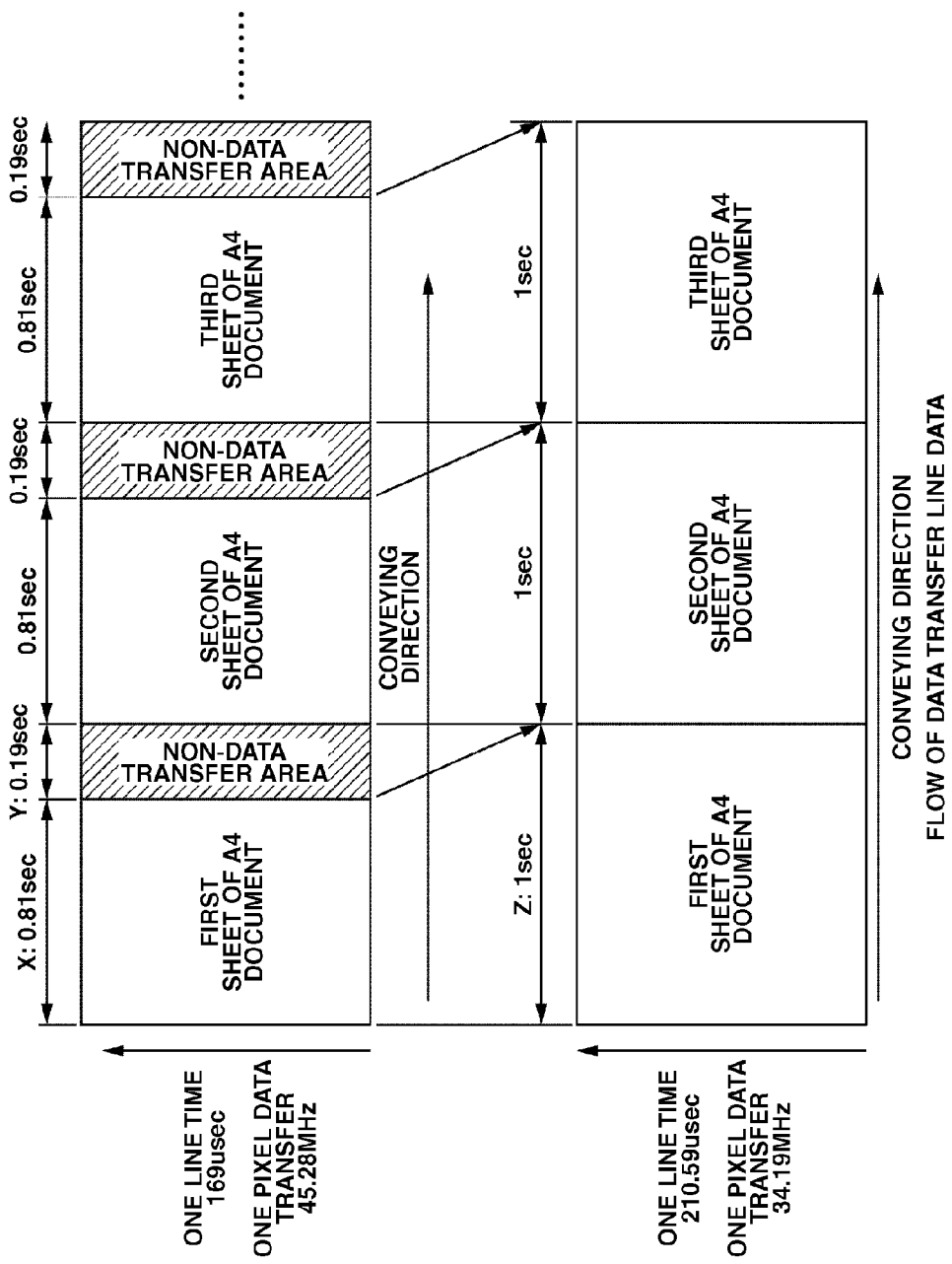
FIG. 7 illustrates an example transfer of image data in a case where image data transfer can be performed during a document conveying interval.

FIG. 7 illustrates an example transfer of image data in a case where image data transfer can be performed during a document conveying interval. In this example, values X, Y, and Z are set to satisfy a relationship X+Y=Z, wherein X represents a reading time required for reading a sheet of document, Y represents a document interval time between a sheet of the document 102 and a next sheet of the document 102 when a plurality of sheets of the document are conveyed to the document reading position, and Z represents a transfer time required for transferring the image data stored in the temporary storage memory 303 to the image data transfer line 307.

Therefore, the CPU 309 controls the pulse generator circuit 305 so as to satisfy the above-described conditions (i.e., the driving speed of the CCD line sensor 126 and the data transfer speed from the temporary storage memory 303 to the processing circuit 401). Thus, the present exemplary embodiment can greatly reduce the data transfer time.

In this case, a required capacity of the temporary storage memory 303 corresponds to a speed difference between the driving speed of the CCD line sensor 126 and the data transfer speed to the data transfer line 307. Namely, if the document interval of 40 mm is set in a reading operation of the document of A4 size, the required memory capacity of the temporary storage memory 303 will be 40 mm (945 line)×7200 pixels×8 bits (=6.9 Mbyte).

In the above-described exemplary embodiment, the transfer time Z is set to satisfy the relationship X+Y=Z. However, optionally a relationship X+Y≧Z>X can be satisfied to obtain similar effects.

As described above, the document reading apparatus according to the present exemplary embodiment can reduce the data transfer speed (i.e., the speed for transferring data to the data transfer line) compared to the driving speed of the CCD line sensor. Therefore, the present exemplary embodiment can reduce the operation speed of the processing circuit (e.g., a printer or a computer) which is provided at a downstream side of the document reading apparatus. Furthermore, the present exemplary embodiment can reduce various problems (e.g., temperature rise, increase in electric power consumption, and generation of radiation noises) which occur when the document reading apparatus operates at a higher clock frequency.

As described above, the document reading apparatus according to the present exemplary embodiment enables the entire system to operate at a lower clock frequency while improving an efficiency of reading a plurality of sheets of a document. Therefore, the above-described exemplary embodiment can facilitate a timing design for the IC that performs image processing. Furthermore, the document reading apparatus according to the present exemplary embodiment can perform an efficient data transfer operation while suppressing temperature rise, electric power consumption, and radiation noises.

The present invention is not limited to the above-described reading apparatus that operates in the "document feeding-reading" mode. The present invention can be also applied to a document reading apparatus that operates in the "document fixed-reading" mode according to which a reading unit moves in the sub-scanning direction to read an image of a document sheet set stationary on a document positioning glass plate.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A document reading apparatus comprising:
   a conveying unit configured to sequentially convey a plurality of documents along a conveyance path at a predetermined interval;
   a reading unit configured to obtain image data by sequentially reading each of the plurality of documents conveyed by the conveying unit at a predetermined reading position;
   a storage unit configured to store the image data obtained by the reading unit; and a transfer unit configured to transfer the stored image data to a transfer destination, wherein the transfer unit transfers the image data to the transfer destination to satisfy a relationship $X+Y \geq Z > X$, wherein X represents a reading time required for the reading unit to read one of the plurality of documents, Y represents an interval time between an end of reading the one of the plurality of documents and a beginning of reading a next one of the plurality of documents, and Z represents a transfer time required for transferring the image data of one of the plurality of documents by the transfer unit.

2. The document reading apparatus according to claim 1, wherein the conveying unit conveys the plurality of documents one by one at a constant interval.

3. The document reading apparatus according to claim 2, wherein the conveying unit conveys the plurality of documents such that a document-to-document interval is a predetermined distance.

4. The document reading apparatus according to claim 1, wherein a driving speed of the reading unit or a transferring speed of the transfer unit is changeable.

5. The document reading apparatus according to claim 1, wherein the transfer unit performs an operation for transferring the image data from the storage unit to the transfer destination, concurrently with an operation for storing the image data into the storage unit.

6. A method for a document reading apparatus:
sequentially conveying a plurality of documents along a conveyance path at a predetermined interval;
obtaining image data by sequentially reading each of the plurality of documents conveyed at a predetermined reading position;
storing the obtained image data into a storage medium; and
transferring the stored image data to a transfer destination,
wherein the image data is transferred to the transfer destination to satisfy a relationship $X+Y \geq Z > X$, wherein X represents a reading time required for reading one of the plurality of documents, Y represents a document interval time between an end of reading the one of the plurality of documents and a beginning of reading a next one of the plurality of documents, and Z represents a transfer time required for transferring the image data of one of the plurality of documents.

* * * * *